US011005828B1

(12) United States Patent
Kapp et al.

(10) Patent No.: US 11,005,828 B1
(45) Date of Patent: May 11, 2021

(54) SECURING DATA AT REST

(71) Applicant: BAE Systems Information and Electronic Systems Integration Inc., Nashua, NH (US)

(72) Inventors: Benjamin Kapp, San Diego, CA (US); Jibu Abraham, San Diego, CA (US); Kevan O. Vanhoff, Portland, OR (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 425 days.

(21) Appl. No.: 16/194,584

(22) Filed: Nov. 19, 2018

(51) Int. Cl.
*H04L 29/06* (2006.01)
*H04L 9/08* (2006.01)
*H04L 9/32* (2006.01)
*H04L 9/06* (2006.01)
*H04L 9/00* (2006.01)
*G06F 21/62* (2013.01)

(52) U.S. Cl.
CPC ...... *H04L 63/0471* (2013.01); *G06F 21/6227* (2013.01); *H04L 9/008* (2013.01); *H04L 9/0631* (2013.01); *H04L 9/0656* (2013.01); *H04L 9/0897* (2013.01); *H04L 9/3236* (2013.01); *H04L 9/3247* (2013.01)

(58) Field of Classification Search
CPC ............... H04L 63/029; H04L 63/0421; H04L 63/0428; H04L 63/067; H04L 63/0823; H04L 63/12; H04L 9/0643; H04L 9/0656; H04L 9/3221; H04L 9/3247; H04L 9/3263
USPC ..................................... 713/153, 168; 726/3
See application file for complete search history.

(56) References Cited

U.S. PATENT DOCUMENTS

| 9,977,918 B2 * | 5/2018 | Fan ..................... G06F 21/6227 |
| 2003/0105956 A1 * | 6/2003 | Ishiguro ................ H04L 9/0836 |
| | | 713/158 |
| 2008/0022374 A1 * | 1/2008 | Brown ................ H04W 12/069 |
| | | 726/5 |
| 2011/0138183 A1 * | 6/2011 | Reddy ................... H04L 9/0891 |
| | | 713/169 |
| 2011/0185169 A1 * | 7/2011 | Munger .............. H04L 61/6004 |
| | | 713/153 |

(Continued)

OTHER PUBLICATIONS

Benjamin Kapp et al., "Securing Data in Motion", U.S. Appl. No. 16/223,181, 36 pages.

*Primary Examiner* — Samson B Lemma
(74) *Attorney, Agent, or Firm* — Finch & Maloney PLLC

(57) ABSTRACT

Techniques are disclosed for securing data stored on a minimally trusted third-party data store. The techniques include directing all messages for storing data and retrieving stored data through a security server. The security server can be configured to receive encrypted data for storage at a remote data store, decrypt the encrypted data, generate index information for the decrypted data, encrypt the index information, encrypt the decrypted data to produce re-encrypted data, digitally sign the re-encrypted data, and cause transmission of the re-encrypted data and the encrypted index information to the remote data store. To access stored data, the security server can be configured to receive a query for stored data, encrypt the query, cause transmission of the encrypted query to the remote data store, receive a copy of the stored data, process the copy of the stored data, and cause transmission of the stored data to the requesting computer.

18 Claims, 9 Drawing Sheets

(56) References Cited

U.S. PATENT DOCUMENTS

| | | | |
|---|---|---|---|
| 2013/0042105 A1* | 2/2013 | Orsini | H04L 63/0272 |
| | | | 713/157 |
| 2013/0167207 A1* | 6/2013 | Davis | G06F 21/316 |
| | | | 726/5 |
| 2014/0304503 A1* | 10/2014 | O'Hare | H04L 63/0823 |
| | | | 713/157 |
| 2016/0028548 A1* | 1/2016 | Yao | H04L 63/062 |
| | | | 713/176 |
| 2020/0186506 A1* | 6/2020 | Shockley | H04L 9/3265 |

* cited by examiner

SECURING DATA AT REST

FIELD OF THE DISCLOSURE

This disclosure relates to secure storage of data, and more specifically to improved data security when storing secure or otherwise classified data on a minimally trusted device.

BACKGROUND

With the onset of the digital age, communication between interconnected devices over communication networks is becoming widespread. Countless times a day, devices communicate with each other to relay information. Oftentimes, the communication involves transmission of data that is sensitive to the sender and/or receiver. In such cases where the information is of a sensitive nature, encryption techniques can be employed to secure the data in such a way that only authorized parties can access the data and those who are not authorized cannot. Similarly, stored data can be encrypted for storage in such a way that only authorized parties can search for and access the stored data. Depending on the technical capability of a given eavesdropper, however, some encryption techniques are relatively easy to defeat.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples and are incorporated in and constitute a part of this specification but are not intended to limit the scope of the disclosure. The drawings, together with the remainder of the specification, serve to explain principles and operations of the described and claimed aspects and examples. For purposes of clarity, not every component may be labeled in every figure.

DETAILED DESCRIPTION

Figure 1:
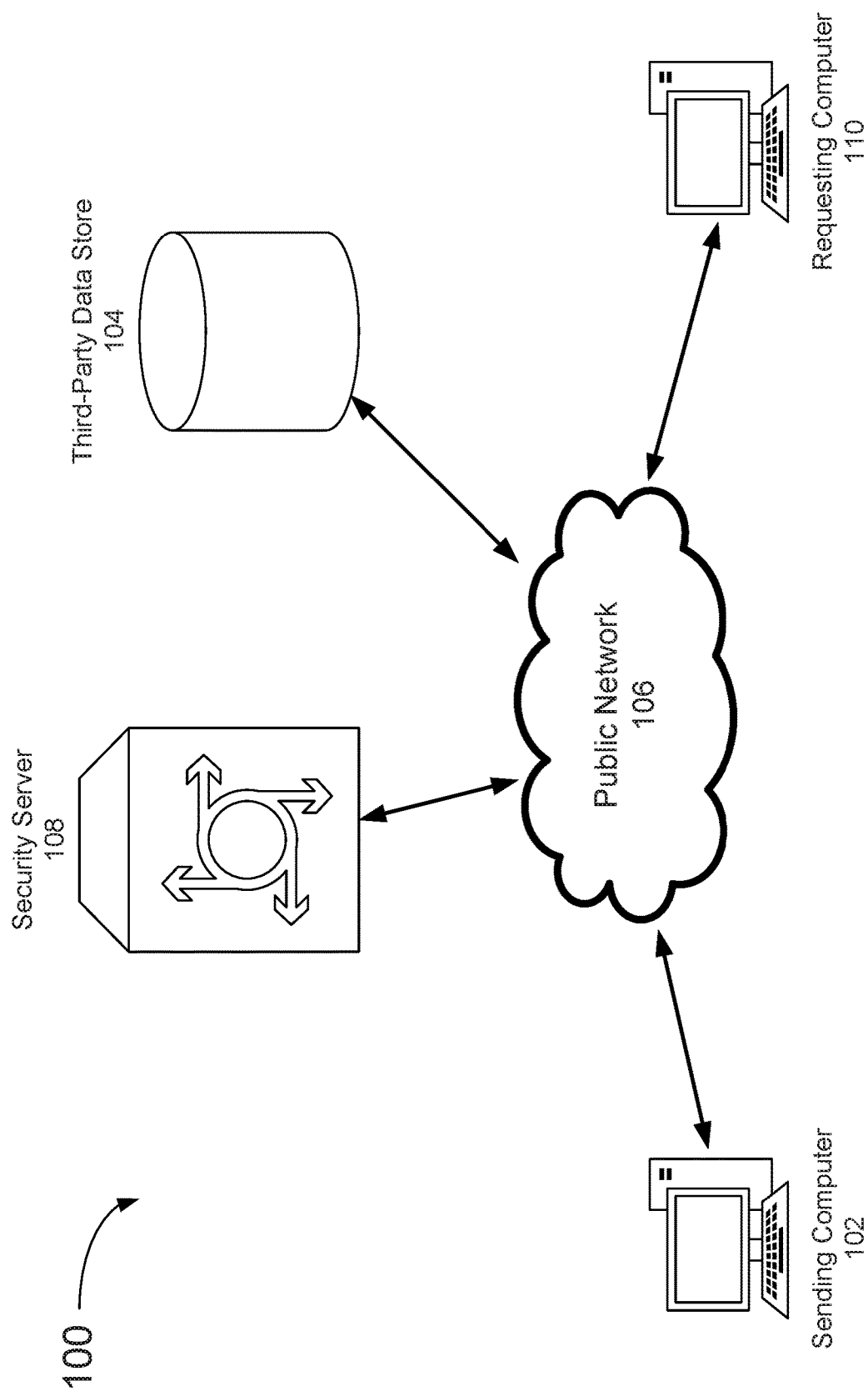
FIG. 1 depicts a schematic illustration of a sample network for transmitting and storing secure data, in accordance with an embodiment of the present disclosure.

Given the recognized importance of maintaining the security and integrity of digital data, significant resources have been devoted to developing data security technologies to resist malicious attacks and other potentially compromising events. While secure and reliable digital storage technologies have been proposed for so-called data at rest, it is important to recognize that the data should be secure not only during storage in a storage resource, but also while outside the storage resource, such as during transmission to the data storage and extraction from the data storage. For example, sensitive data, such as credit card information, will ideally be secured during usage at the point of sale, during communication of such data to a bank or clearing house, and during storage of the data by the bank or clearing house. Efforts to address this concern have focused on cryptographic schemes for the security of data during consumption and transmission. Modern cryptographic schemes involve encryption techniques that transform the data into an unintelligible form during transmission and storage in order to conceal the data from eavesdroppers. However, as noted above, some encryption techniques are relatively more vulnerable to attack or otherwise inadequate.

For example, existing schemes for securing data during motion on an untrusted network can have various drawbacks. A malicious party can eavesdrop on communications, malicious messages can be sent anonymously or with forged sender credentials, and messages can include undecipherable data improperly encoded for the recipient to accurately decode. Additionally, threats can include zero-day vulnerabilities (e.g., a vulnerability that is unknown to the vendor or developer of a software application) and insider threats on secure networks.

It is common today to hear of both commercial and government organizations being hacked with increasing frequency and severity. Often highly sensitive data is stolen from computer systems stored on disk or a database, and such breaches result in massive loses for the company and/or the country. Many of these breaches occur simply because security holes or other flaws are left in systems. For example, classified or otherwise secret data is commonly stored on publicly accessible data stores such as cloud-based storage systems.

Thus, and in accordance with certain of the embodiments disclosed herein, techniques and processes for securing data during transmission to and storage on a minimally trusted hardware platform are described. In accordance with various embodiments of the present disclosure, the secure data storage techniques as described herein provide a high assurance of the security of the data even when the hardware the data is stored on is untrusted, such as a third-party cloud system.

According to one example embodiment, a computer program product includes one or more non-transitory machine-readable mediums encoding instructions that when executed by one or more processors cause a process to be carried out for securely storing data at a remote data store. The process includes receiving encrypted data for storage at a remote data store, decrypting the encrypted data to produce decrypted data, generating index information for the decrypted data, encrypting the index information to produce encrypted index information, encrypting the decrypted data to produce re-encrypted data, digitally signing the re-encrypted data, and causing transmission of the re-encrypted data and the encrypted index information to the remote data store over an untrusted network.

According to another example embodiment, a communication system includes one or more non-transitory machine-readable mediums configured to store instructions and one or more processors being configured to execute the instructions stored on the one or more non-transitory machine-readable mediums. In this example, execution of the instructions causes the one or more processors to receive encrypted data for storage at a remote data store, decrypt the encrypted data to produce decrypted data, generate index information for the decrypted data, encrypt the index information to produce encrypted index information, encrypt the decrypted data to produce re-encrypted data, digitally sign the re-encrypted data, and cause transmission of the re-encrypted data and the encrypted index information to the remote data store over an untrusted network.

Example use cases are instructive as to how the techniques provided herein can be employed. In one example use case, for instance, assume a first user (herein after termed "Alice") that is on a trusted network such as a company-controlled Intranet wants to store data on a third-party minimally trusted data store. Alice can use a computing device (sometimes referred to herein as a "sending device," "sending computer," or "data transmission device") to apply a particular set of security protocols to the data prior to sending that can be used to both secure the data during transmission and provide data integrity and message authentication when received a receiving computing device. A second user (herein after termed "Bob") can later request access to the stored data from the data store by submitting a query from a requesting device (sometimes referred to herein as a "requesting computer" or "recipient device").

For example, the security protocols can include the processes and techniques as taught in U.S. patent application Ser. No. 16/223,181 entitled "Securing Data in Motion," the content of which is hereby incorporated herein in its entirety. More specifically, the security protocols can include, for example, creating multiple hashes or hash values of the original data. The original data and the hash values can be digitally signed by the sending device and the signed data and hash values can be encrypted. The encrypted data and hash values can be encapsulated using, for example, a tunneling protocol and then transmitted to a security server for further processing.

As described herein, the processes and techniques for providing securely stored data can include a specific network architecture. For example, the network can include a security server that is configured to process all received data prior to storage. Additionally, all querying of stored data can also be processed by the security server such that a specific level of security is maintained, and each query is verified for authenticity and authorization.

The security server can receive the encrypted data and hash values and perform an opposite process as the sending device. For example, the security server can de-encapsulate the data and the hash values. The security server can further decrypt the data and hash values and verify the signature certificates associated with the message and hash values. The security server can verify the hash values and determine whether any changes were made to the data during the transmission. If the data and the hash values are verified by the security server, the security server can process the data to secure for transmission to the data store. In certain implementations, the security server can index the data. The security server can encrypt the index and the data itself. The security server can digitally sign the index and data and transmit the index and data to the third-party data store.

In order to access the stored data, a requesting device can send a query to the security server. The security server can analyze the query and determine if the query is authentic and from a requester authorized to make the request (and access the stored data). If verified, the security server can encrypt the query and query the data store on behalf of the requester. The security server can receive results of the query from the data store, decrypt the search results, and transmit the search results to the requester using a similar process as that described above in regard to the initial sending device. For example, the security server can create multiple hashes or hash values of the original data, digitally sign the data and the hash values, and encrypt the data and the hash values. The encrypted data and hash values can be encapsulated then transmitted by the security server to the requesting device for further verification and presentation of the data to Bob. At the requesting device, a similar verification as performed by the security server can be used to verify that the data has maintained data integrity, the sender has been authenticated, and the recipient Bob is authorized to receive and view the data.

As the security server is configured to both handle storage of the data as well as process and queries for the data, the third-party data store only needs to be minimally trusted as all data being stored thereon has been encrypted.

Thus, the foregoing framework provides a robust multi-device security protocol for transmitting secure or classified information from a sending device to minimally trusted data store with high assurance of the security of the data during transmission and storage. The added security resulting from the various security protocols being performed by both the sending device and the security server prior to storage of the data provides for anonymity, immunity to eavesdropping, and undecipherable communications.

System Architecture

Turning now to the figures, FIG. 1 is a schematic illustration of a sample network for transmitting and securely storing data, in accordance with an embodiment of the present disclosure. More specifically, network 100 as shown in FIG. 1 illustrates a sample architecture for implementing the secure data transmission and storage techniques as described herein. In network 100, a user of a computing device such as sending computer 102 can securely transmit data for secure storage on a remote data storage device. For example, as shown in FIG. 1, a sender can securely transmit data to third-party data store 104. In certain implementations, the sending computer 102 can be located in a secure network such as a company-controlled Intranet. The third-party data store 104 can be located in a public or untrusted network such as the Internet or, as shown in FIG. 1, can be operably connected to the sending computer 102 via a public network 106 such as the Internet. In certain implementations, the third-party data store 104 can be located in a secure network such as a second company-controlled Intranet located at a remote location from the sending computer 102 and, as shown in FIG. 1, can be coupled to the sending computer via public network 106.

To implement the techniques as described herein, the network 106 can further include a security server 108 configured to provide enhanced security features. As shown in FIG. 1, the security server can be located in a remote location from both sending computer 102 and third-party data store 104 and operably coupled to both via the public network 106. However, it should be noted that this arrangement is provided by way of example only. In certain implementations, the location of the security server 108 can vary from that as shown in the example network 100. For example, the security server 108 can be located within the same secure network as the sending computer 102. In another example, the security server 108 can be located within the same secure network as the third-party data store 104.

In certain implementations, in order to provide secure data transfers with enhanced integrity, authentication, and authorization across multiple domains (e.g., one or more secure networks and a public network such as the example shown in FIG. 1), all data transferred between the sending computer and the third-party data store 104 (or, alternatively, a set of data having a specific security or confidentiality level) can be first directed to the security server for authorization and authentication, and then can be directed to the third-party data store.

Additionally, as shown in FIG. 1, the network 100 can also include a requesting computer 110 configured to transmit a request to the security server 108 for data stored on the third-party data store 104. AS described above, by directing all data queries through the security server 108, additional security can be provided for the data stored on the third-party data store 104.

Figure 2:
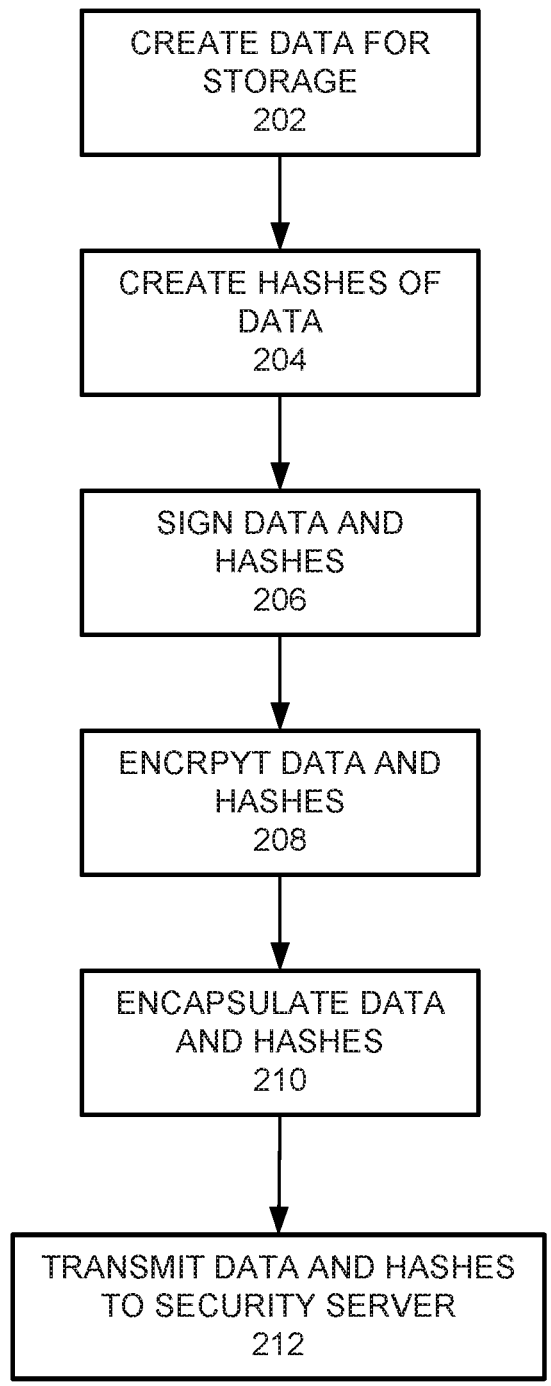
FIG. 2 depicts a flow diagram illustrating an example process for processing data to be sent securely, in accordance with an embodiment of the present disclosure.

Referring now to FIG. 2, a sample process for generating secure data at, for example, a data transmitting device similar to sending computer 102 as described above in reference to FIG. 1. For example, the process steps as shown in FIG. 2 can be performed by one or more processing devices integrated into the data transmitting device and being configured to execute one or more instructions to perform one or more operations.

As shown in FIG. 2, the process can begin when a user creates 202 initial data or determines a set of initial data to be securely stored at a remote location such as the third-party data store 104 as described above in regard to FIG. 1. The initial data can include secure or classified information such as financial records, military plans or details, medical information, development plans, and other similar secure data. The one or more processors can create 204 a set of hash values for the initial data. For example, the set of hash values can be created 204 using the latest variants of unbroken cryptographic hash functions. A cryptographic hash function uses a mathematical algorithm to map data of arbitrary size to a bit string of a fixed size (the hash) and is designed to be a one-way function, that is, a function which is infeasible to invert. Typically, the only way to recreate the input data from an ideal cryptographic has function's output is to attempt a brute force search of all possible inputs to see if they produce a match. By using multiple hash functions as described herein, even if one of the cryptographic hash functions is broken, it is unlikely that all of the other cryptographic hash functions will be broken simultaneously. Thus, by using multiple cryptographic hash functions, the process mitigates the risk to data integrity of the original data. Examples of cryptographic hash functions that can used herein to create 204 the hash values of the initial data include MD6, SHA-3, BLAKE2b, Kangaroo Twelve, Whirlpool, RIPEMD-320, Tiger-192, and other commonly used cryptographic hash functions.

Figure 3:
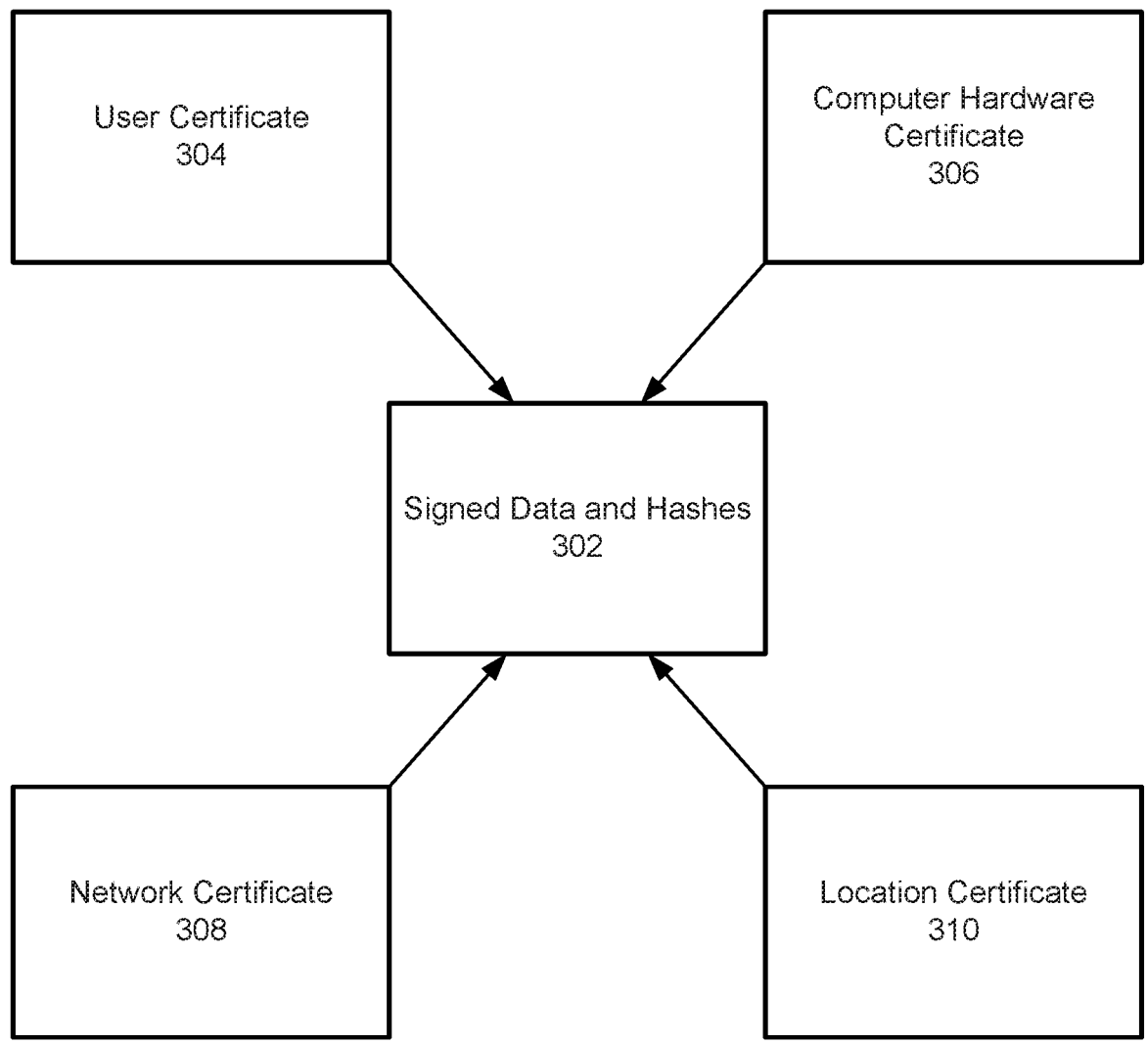
FIG. 3 depicts a block diagram illustrating a sample set of certificates for signing secure data, in accordance with an embodiment of the present disclosure.

As further shown in FIG. 2, the one or more processors can digitally sign 206 the data and the hash values using one or more digital certificates. As used herein, digitally signing the data refers to presenting authenticity of data using a mathematical scheme. In certain implementations, a specific set of certificates can be used to digitally sign 206 the data and hash values. For example, as shown in FIG. 3, a user certificate 304, a computer hardware certificate 306, a network certificate 308, and a location certificate 310 can be used to digitally sign the data and hash values 302 (as shown in block 206 of FIG. 2).

As described herein, a user certificate 304 can include a certificate generated specifically for an individual user, in this example the sender of the data. The user certificate 304 can be generated based upon several factors. For example, the user certificate 304 can be generated from a combination of the user's password and a universal second factor to provide for a simplified two-factor authentication when generating the user certificate.

As described herein, the computer hardware certificate 306 can include a certificate integrated into a trusted platform module (TPM), for example, a secure crypto-processor functioning as a dedicated microcontroller to secure hardware through the use of one or more cryptographic keys. In some examples, the computer hardware certificate 306 can be generated from a hash of the components of a physical computing device (e.g., a hash of the serial numbers of various components contained within a data transmitting device such as sending computer 102 as described above).

As described herein, the network certificate 308 can include verification that the sender is actually using the network they claim they are sending data from (e.g., a specific secure network such as a company-controlled Intranet). As used herein, the network certificate 308 can prevent spoofing of IP and MAC addresses by a potentially malicious sender. In certain implementations, to obtain a network certificate 308, a computing device such as a data transmitting device as used in this example can transmit a request for the network certificate to a network verification server. As the request is propagated through the network, each node that the data passes through can sign the packets (e.g., using a node-specific private key). The network verification server can then independently verify each of the node hops the request took throughout the network. In some example, the network verification server can also maintain a map of the nodes in the network and compare the route the request took through the network to the map. If the route fits the map, the network verification server can determine with high confidence that the data transmitting device belongs to the network it is claiming. After verification, the network verification server can provide a network certificate to the data transmitting device for use in creating a digital signature as described herein.

As described herein, the location certificate 310 can include an indication of the data transmission device's geolocation when sending data. There are two main types of geolocation: passive geolocation and active geolocation. Passive geolocation includes a process by which a user calculates their own geolocation by, for example, using signals from global positioning satellites (GPS). In certain implementations, a data transmitting device can scan its surrounding environment to determine proximity to known wireless devices such as Wi-Fi access points, cellular towers, GPS, X-ray pulsars, and other similar wireless devices. The data transmitting device can use the proximity information to approximate its position and generate a location certificate 310 including this position information. However, one drawback with passive geolocation is that a dishonest user can fake their location.

In contrast to passive geolocation, active geolocation includes a data transmission device sending information to one or more trusted devices having known locations which can independently verify the location of the user. One drawback with active geolocation is that an eavesdropper can intercept the location verification messages and use them to determine the sender's location. In a military context, this could be catastrophic as it could reveal position information to an enemy. Thus, in certain situations such as being in a warzone, passive geolocation can be used to keep location information hidden from eavesdroppers. Otherwise, active geolocation generally provides a stronger guarantee of a user's geolocation.

Figure 4:
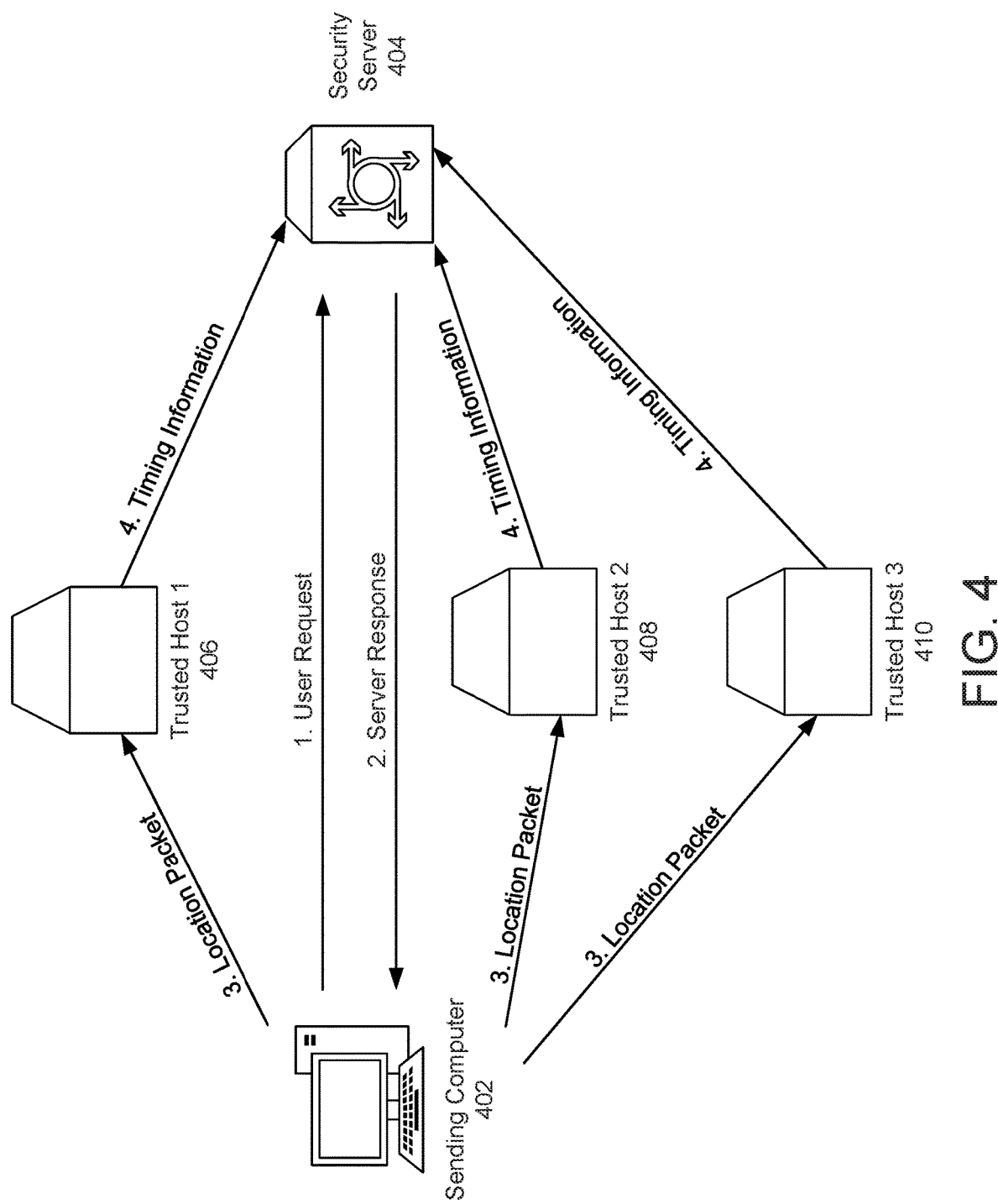
FIG. 4 depicts a sample flow of data through a network for generating and verifying a geolocation certificate, in accordance with an embodiment of the present disclosure.

When using active geolocation, a data transmitting device initially requests a location certificate from a security server. For example, FIG. 4 illustrates a sample network and data flow related to an active geolocation verification process. In certain implementations, a sending computer 402 transmits (1) a user request to security server 404. The security server 404 can receive the user request and provide (2) a server response. For example, the server response can include a list of trusted hosts having known locations and that are geographically spaced apart (e.g., trusted host 406, trusted host 408, and trusted host 410 as shown in FIG. 4) and a corresponding random number for each trusted host to the sending computer 402. The sending computer 402 can receive the list of trusted hosts and transmit (3) each random number to its corresponding trusted host. For example, as shown in FIG. 4, the sending computer 402 can transmit random number 1 to trusted host 406, random number 2 to trusted host 408, and random number 410 to trusted host 410.

Each of the trusted hosts 406, 408, 410 can receive their corresponding random numbers and time stamp the random numbers upon receipt. The trusted hosts 406, 408, 410 can forward (4) the timing information to the security server 404 for analysis and verification. Upon receipt of the timing information, the security server 404 can use the timing information to determine how long it took from the time the sending computer 402 transmitted the random number until the corresponding trusted host 406, 408, or 410 received the random number. As the amount of time it takes for information to travel is largely dependent upon distance (among various other things), and since the location of each of the trusted hosts 406, 408, 410 is known, the security server 404 can use the timing information to roughly trilaterate the location of the sending computer 402. This process for active geolocation is particularly effective if one of the trusted hosts 406, 408, or 410 is geographically close to the sending computer 402. The sending computer 402 can slow down the timing information (e.g., by delaying transmission of the random numbers upon receipt) but the sending computer cannot make the random numbers arrive quicker. As such, if a trusted host that is geographically close to the sending computer receives its random number late, the security server can determine that the sending computer is lying or otherwise faking its location.

Referring again to FIG. 4, once the security server has verified the location of the sending computer 402, the security server can issue the sending computer a location certificate (e.g., location certificate 310 as discussed above) to be used by the sending computer as a means for validating its location when signing the data and hash values.

Referring again to FIG. 3, it should be noted that the combination of a user certificate 304, a computer hardware certificate 306, a network certificate 308, and a location certificate 310 for use in creating the digitally signed data and hash values 302 is shown by way of example only. Various other combination of certificates including a subset of those shown in FIG. 3 can be used to digitally sign the data and hash values as described herein. Similarly, a set of certificates including additional certificates not illustrated in FIG. 3 can be used as well.

By providing a digital signature of the data and the hash values, the techniques as described herein provide improved authentication, data integrity, and non-repudiation. For authentication, the digital signature can be used to authenticate the source of the data. Ownership of the specific certificate (or, in this example, set of certificates) is bound to a specific user and a valid signature shows that the data was sent by the user. By comparing the authentication information as contained in the digital signature with the sender information associated with the data, a recipient can quickly verify that the data did originate from the sender. For data integrity, both the sender and the recipient of data have a need for confidence that the data has not been altered during transmission. Although encryption (as described below) can hide the content of data, it may be possible to change or otherwise corrupt encrypted data without understanding the content. However, if the data is digitally signed, any change in the data after signature invalidates the signature. For non-repudiation, an entity that has properly digitally signed data cannot deny having signed the data at a later time. However, it should be noted that improved authentication, data integrity, non-repudiation, and other advantages of providing a digital signature rely on the specific set of certificates used to generate the digital signature being kept secret and non-revoked prior to their usage.

Referring back to FIG. 2, the one or more processors can encrypt 208 the signed data and hash values. In certain implementations, a standard random-number based encryption technique can be used. For example, a one-time pad (OTP) encryption technique can be used. OTP is an encryption technique that uses a one-time pre-shared key the same size as, or longer than, the data being sent. In this technique, a plaintext or set of unencrypted information is paired with a random secret key (also referred to as a one-time pad). Then, each bit or character of the plaintext is encrypted by combining it with the corresponding bit or character from the pad using modular addition. If the key used is truly random, is at least as long as the plain text, is never reused in whole or in part, and is kept secret, the resulting ciphertext will be impossible to decrypt or break.

Figure 5:
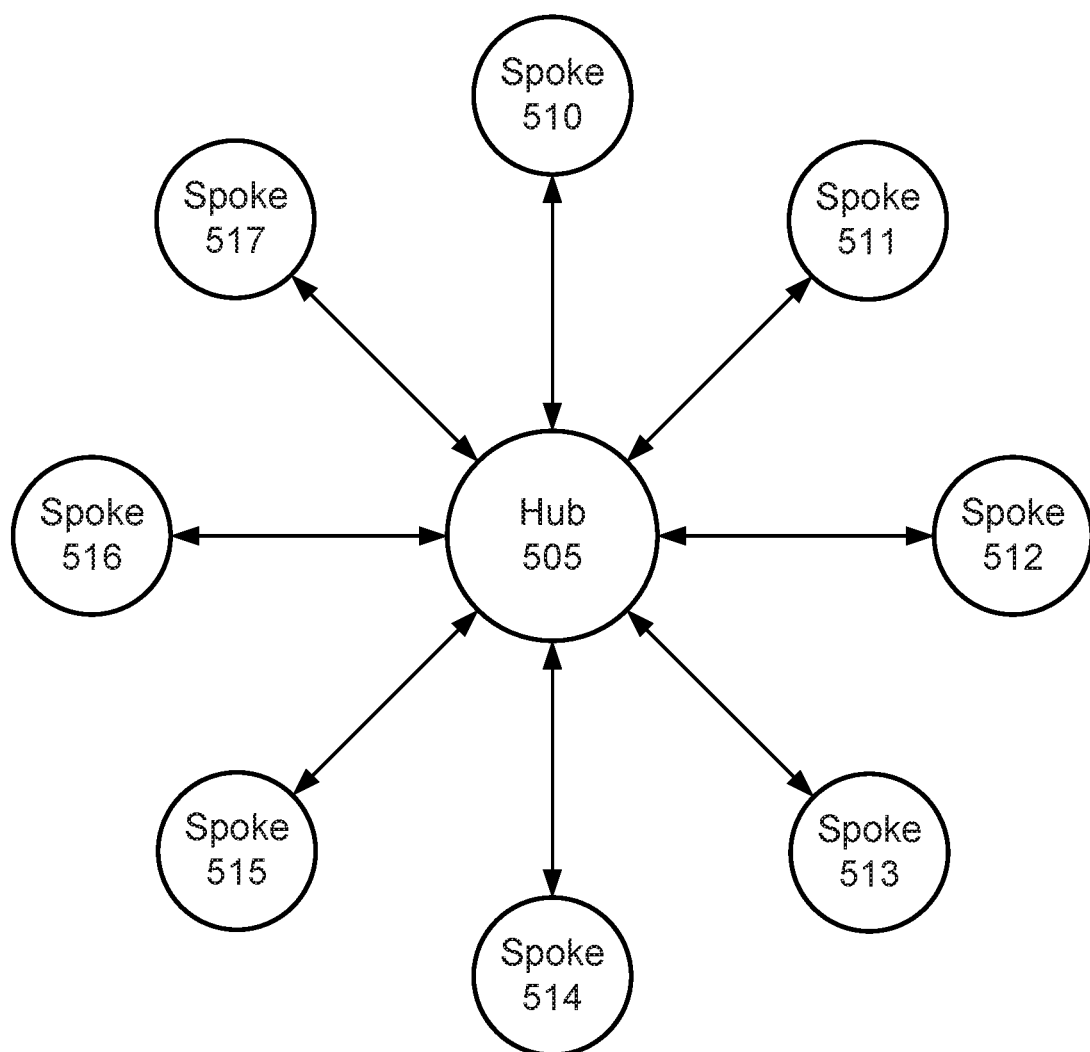
FIG. 5 depicts a block diagram illustrating a sample hub and spoke network architecture, in accordance with an embodiment of the present disclosure.

However, as noted, to use a OTP the key must be shared between users. For example, to continue the above example, for Alice to communicate with Bob, they must share a secret OTP. If Alice wishes to communicate with a third party (hereinafter termed "Charlie"), she and Charlie will need a second OTP. If Bob wants to communicate with Charlie as well, they will need a third OTP. This causes an undesirable increase in the number of secret keys being distributed throughout a group of users and increases the risk that one or more of the secret keys can be compromised. To address this problem, a spoke and wheel model can be used. For example, FIG. 5 illustrates a sample network 500 organized using a spoke and wheel model. The central hub 505 can be a trusted device such as security server 108 as described above. The hub 505 can be operably coupled to each of group member devices or spokes 510, 511, 512, 513, 514, 515, and 516 (hereinafter collectively referred to as "the spokes"). In this arrangement, the hub can store a copy of each spoke's secure key. As such, sending a message to a new member does not require a new key for each member in the network 500. For example, if spoke 517 joins network 517, it can exchange a key directly with the hub 505. Thus, existing members can simply send a message to the hub 505 with an indication that the message is directed to the new member spoke 517 and the hub can decrypt the message using the sender's secret key and encode using the new member's secret key. Thus, the burden of maintaining a large number of secret OTPs for each member in a network, as well as the risk that a secret OTP may be lost, is reduced.

Referring again to FIG. 2, the one or more processors can encapsulate the data and hash values. For example, the one or more processors can encapsulate 210 the data and hash values by performing one or more logic functions configured to performing a tunneling protocol such as a double virtual private network (VPN) tunnel. A tunneling protocol works by using the data portion of a packet (i.e., the payload) to carry packets that actually provide services such as remote addressing. Tunneling can use a layered protocol similar to the transmission control protocol/Internet protocol (TCP/IP) protocol suite, but typically violates the layering of traditional protocol suites by using the payload to carry a service not normally provided by the network the data is being transmitted over. Because tunneling involves repackaging the traffic data into a different form and is typically used with encryption as is described herein, it can further mask the nature of the traffic that is run through a tunnel.

After encapsulation, the one or more processors can transmit the data and hash values to the security server (e.g., security server 108 as shown in FIG. 1). In order to even more securely transmit the data over an untrusted network such as public network 106 as shown in FIG. 1, the one or more processors can transmit 212 the data and hash values using a secure transmission protocol such as the zero knowledge communication protocol described in U.S. patent application Ser. No. 16/114,654 filed Aug. 28, 2018, the content of which is incorporated herein by reference in its entirety. To briefly summarize, the zero knowledge communication protocol unconditionally prevents an eavesdropper from gaining any information about the information being communicated. The protocol is based primarily on three key parts. First, the usage of a OTP as described above to provide unconditional confidentiality. Second, the constant sending of information so that an eavesdropper will not get any side channel information about when data is and is not sent, or how large data being sent is. And finally, the use of an unconditional anonymity protocol to prevent an eavesdropper from being able to determine who is sending and who is receiving any given communication. With these three parts in place, an eavesdropper cannot know who, what, when, why, or where data is being sent, unconditionally, and thus can obtain zero knowledge about the communication.

Figure 6:
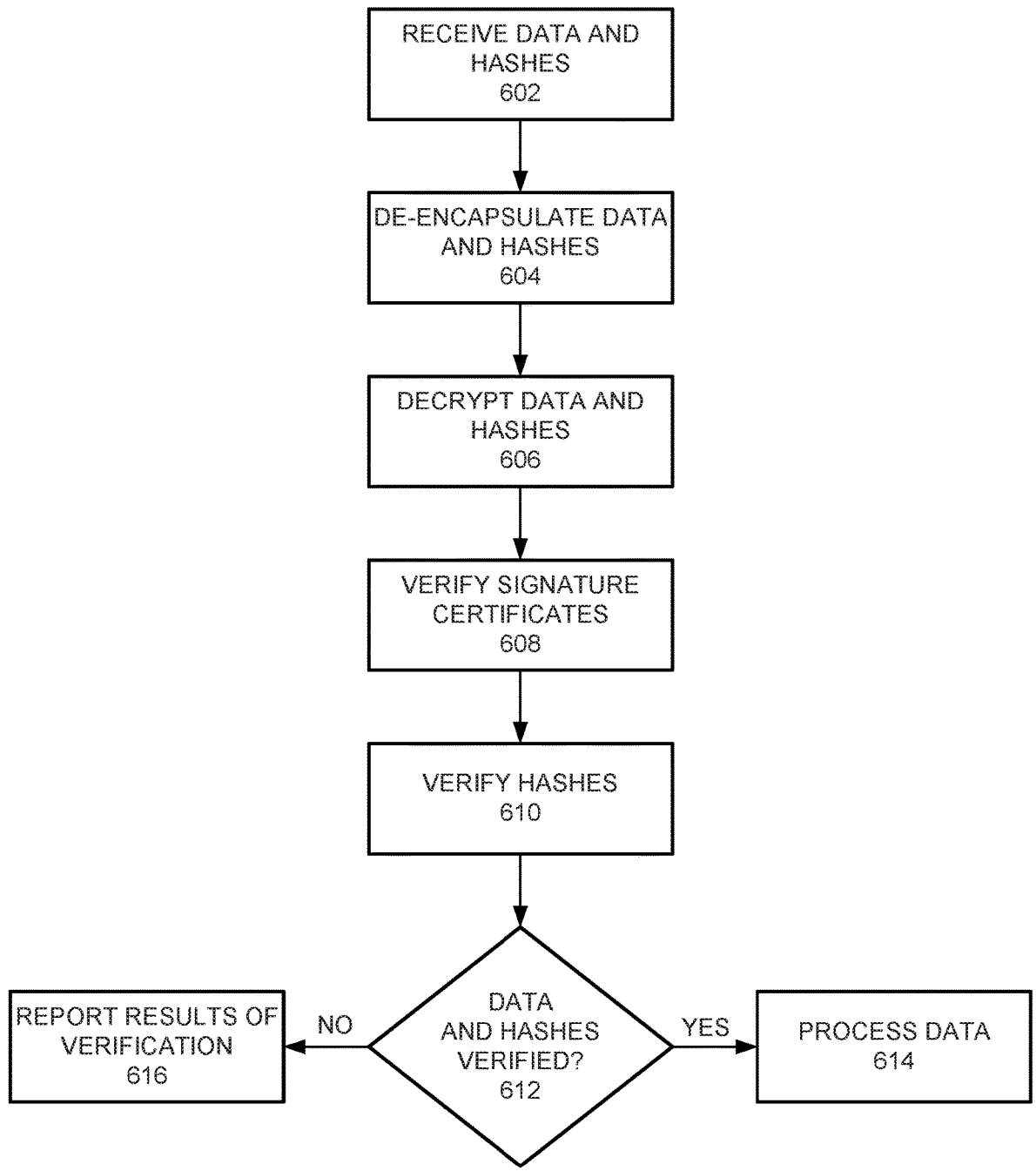
FIG. 6 depicts a flow diagram illustrating an example process for receiving data and processing data at a security server, in accordance with an embodiment of the present disclosure.

Referring now to FIG. 6, a process is illustrated that shows the steps taken by the security server upon receiving the transmitted data and hash values from block 212 of FIG. 2. Initially, the security server can receive 602 the data and hash values. As noted above in the discussion of FIG. 1, the security server can be located in the same secure network as the sending computer, in a public network, or in an alternate secure network. The security server can de-encapsulate 604 the data and hash values by, for example, passing the encapsulated data and hash values through a proper tunnel decryption technique for integrity checking and subsequent decryption. The security server can decrypt 606 the encrypted data and hash value using, for example, the sending device's secure OTP stored on the security server. Next, the security server can verify 608 the signature certificates. For example, the security server can verify 608 that the user certificate, the computer hardware certificate, the network certificate, and the location certificate as described above are authentic and have not been tampered with. The security server can further verify 610 that the hash values are accurate, and the data contained within the data has not been altered or otherwise tampered with during transmission of the data.

If the security server determines 612 that the data and hash values are verified, and the data has not been altered with or otherwise tampered with, the security server can process 614 the data for transmission to a data store for secure storage of the data. If, conversely, the security server determines 612 that the data and hash values have not been verified and the data has been altered during transmission, the security server can report 616 the results of the verification. For example, the security server can be configured to notify the sender of the data as well as a network administrator or other security personnel of a potential malicious attack on the network or network traffic.

Figure 7:
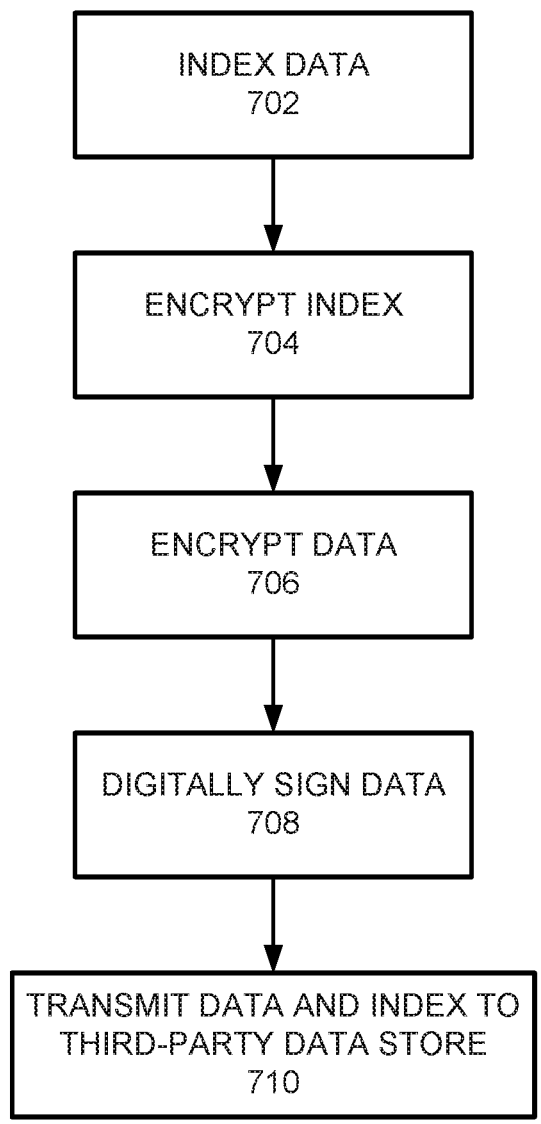
FIG. 7 depicts a flow diagram illustrating an example process for processing data for secured storage, in accordance with an embodiment of the present disclosure.

In the event that the security server does verify the data and hash values, the security server can process 614 the data for transmission to and secure storage on a third-party data store. FIG. 7 illustrates a sample flow for processing the data following the process as shown in FIG. 6.

As shown in FIG. 7, the security server can index 702 the data. In certain implementations, the security server can index 702 the data with respect to portion markings and associated classification levels of the data. In some examples, the indexing can use only those portion markings which are of or below the classification of the data store the data is being transmitted to. For example, if the data store is rated for unclassified/for official use only (FUOU), only portions of the data with such classification markings will be indexed. Similarly, if the data store is rated for secret then only portions of the data marked secret or below will be indexed.

The security server can also encrypt 704 the index information. In certain implementations, the security server can use a homomorphic encryption technique to encrypt the index information. Homomorphic encryption provides for an encryption technique that generates encrypted data that can allows further computation. Thus, homomorphic encryption can be used to securely chain together different services without exposing sensitive data. For example, various indexes reflecting multiple portion markings (e.g., unclassified, secret, top-secret) can be chained together without exposing the unencrypted data for each of those portions.

There are several different schemes for homomorphic encryption, with each scheme having different cryptographic strengths. However, all homomorphic encryption schemes are only as secure as the computational complexity required to perform an attack on the encrypted data. Thus, in certain implementations, the homomorphic encryption techniques can be used, for example, to encrypt the index information rather than the actual data.

Referring again to FIG. 7, the security server can encrypt the data using, for example, Suite B encryption techniques as well as (k, n) threshold encryption techniques. Suite B encryption techniques are a set of cryptographic algorithms promulgated by the National Security Agency (NSA) to serve as an interoperable cryptographic based for classified information. Individual components of the Suite B encryption techniques include advanced encryption standard (AES) with 128 or 256-bit key sizes, elliptic curve digital signature algorithm (for digitally signing data), elliptic curve Diffie-Hellman (for key agreement), and secure hash algorithm 2 (SHA-256 and SHA-384) for hash value generation. The encryption 706 of the data can be enhanced with a (k, n) threshold encryption technique such as Shamir's secret sharing scheme. In such an encryption scheme, the data is divided into n portions, wherein k is the threshold of portions required to reconstruct any information about the data. Thus, if an attacker steals less than the threshold (e.g., k−1 or fewer) it will be impossible for the attacker to reconstruct any information about the data.

The security server can digitally sign 708 the data using, for example, the elliptic curve digital signature algorithm contained in the Suite B encryption techniques and transmit 710 the data and index information to the third-party data store. In certain implementations, the security server can transmit 710 the data and the index information to the third-party data store using a zero knowledge communication protocol as described above. The third-party data store can receive the data and index information and store the data and index information for later access.

As noted above, the security server can function as a proxy for all communications with the final storage system (e.g., the third-party data store). By arranging the data flow in this manner, the security server can inspect all data to be stored to ensure that no information stored there is of an invalid classification. The security server can also cryptographically sign all the data such that no other device can decrypt the data. As the security server can be configured to retain all keys used to encrypt the index information and the data to be stored, no one can decrypt the data without accessing the keys at the security server, thereby providing a single point to be secured and protected to maintain the security of the stored data. Additionally, all queries for the stored data are directed to and processed by the security server (as described in additional detail below in regard to FIG. 8). This provides a cryptographic bottleneck to all access of the stored data, allowing for a centralized point to enforce authentication, authorization, and other security policies for accessing the data at rest solution as described herein.

Figure 8:
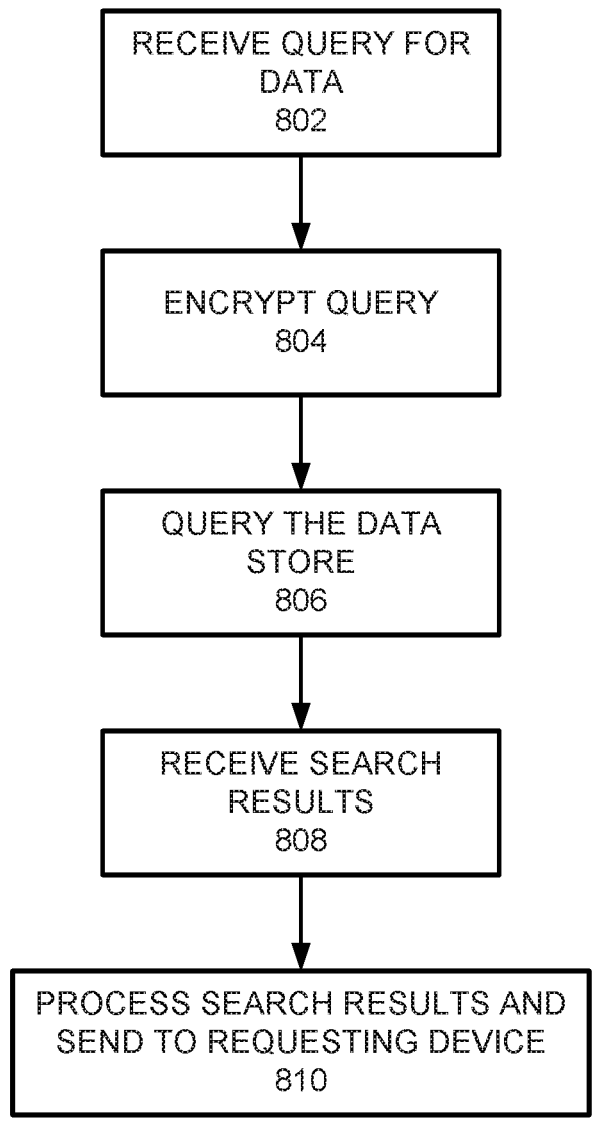
FIG. 8 depicts a flow diagram illustrating an example process for securely querying for, accessing, and receiving securely data, in accordance with an embodiment of the present disclosure.

FIG. 8 illustrates a sample flow for receiving and processing a query for securely stored data according to the processes and techniques as described herein. In certain implementations, the security server can receive 802 a request for securely stored data from a requesting device. The security server can encrypt 804 the query to prevent any potential eavesdropper from determining what type of information is being requested and, by extension, what type of information is stored at a third-party data store. The security server can transmit the encrypted query to the third-party data store, thereby querying 806 the data store for the requested information. The security server can receive 808 the search results (e.g., a set of securely stored data transmitted to the security server by the third-party data store).

As the search results were previously encrypted by the security server and stored in its encrypted state at the third-party date store (without any additional cryptographic functions being performed by the data store), the security server can decrypt the search results and process 810 the results for sending to the requesting device. In certain implementations, the security server can process 810 and send the data using a similar process as that shown in FIG. 2 and discussed above. For example, the security server can create two or more hash values for the data, digitally sign the data and the hash values, and encrypt the data and hash values. However, unlike the previous encryption as described in regard to FIG. 2, rather than use the sending computer's secure OTP as was previously done, the security server can encrypt the data and hash values using the requesting device's secure OTP. The security server can then encapsulate the data and the hash values and send the data and hash values to the recipient.

Upon receipt, the requesting computer can de-encapsulate the data and hash values by, for example, passing the encapsulated data and hash values through a proper tunnel decryption technique for integrity checking and subsequent decryption. The requesting computer can decrypt the encrypted data and hash value using, for example, the requesting computer's secure OTP as stored on the security server and used by the security server when encrypting the data and the hash values. Next, the requesting computer can verify the signature certificates. For example, the requesting computer can verify that the user certificate, the computer hardware certificate, the network certificate, and the location certificate as described above and used by the security server to digitally sign the data and the hash values are authentic and have not been tampered with. The requesting computer can further verify that the hash values are accurate, and the data has not been altered or otherwise tampered with during transmission of the requesting computer.

It should be noted that the processes and techniques as described herein can be augmented and reconfigured to include additional features and operations. For example, the security of the data being stored can be enhanced by using multiple layers of encryption. Certain encryption solutions call for file level protection, platform level encryption (data chunk protection), and disk level protection. In addition to using multi-layer encryption, the processes and techniques as described herein can include using a multi-part encryption technique such as Suite B encryption on one or more of the layers. For example, Suite B encryption can be used on the file level and the platform level. Such an encryption technique would be supported by most standard hardware available at the time of invention. TABLE 1 as provided below details examples of encryption types that could be used in such a scheme:

TABLE 1

| File Level | Platform Level | Disk Level |
|---|---|---|
| RSA 3072 AES256 | RSA 3072 AES256 | AES256 |

Figure 9:
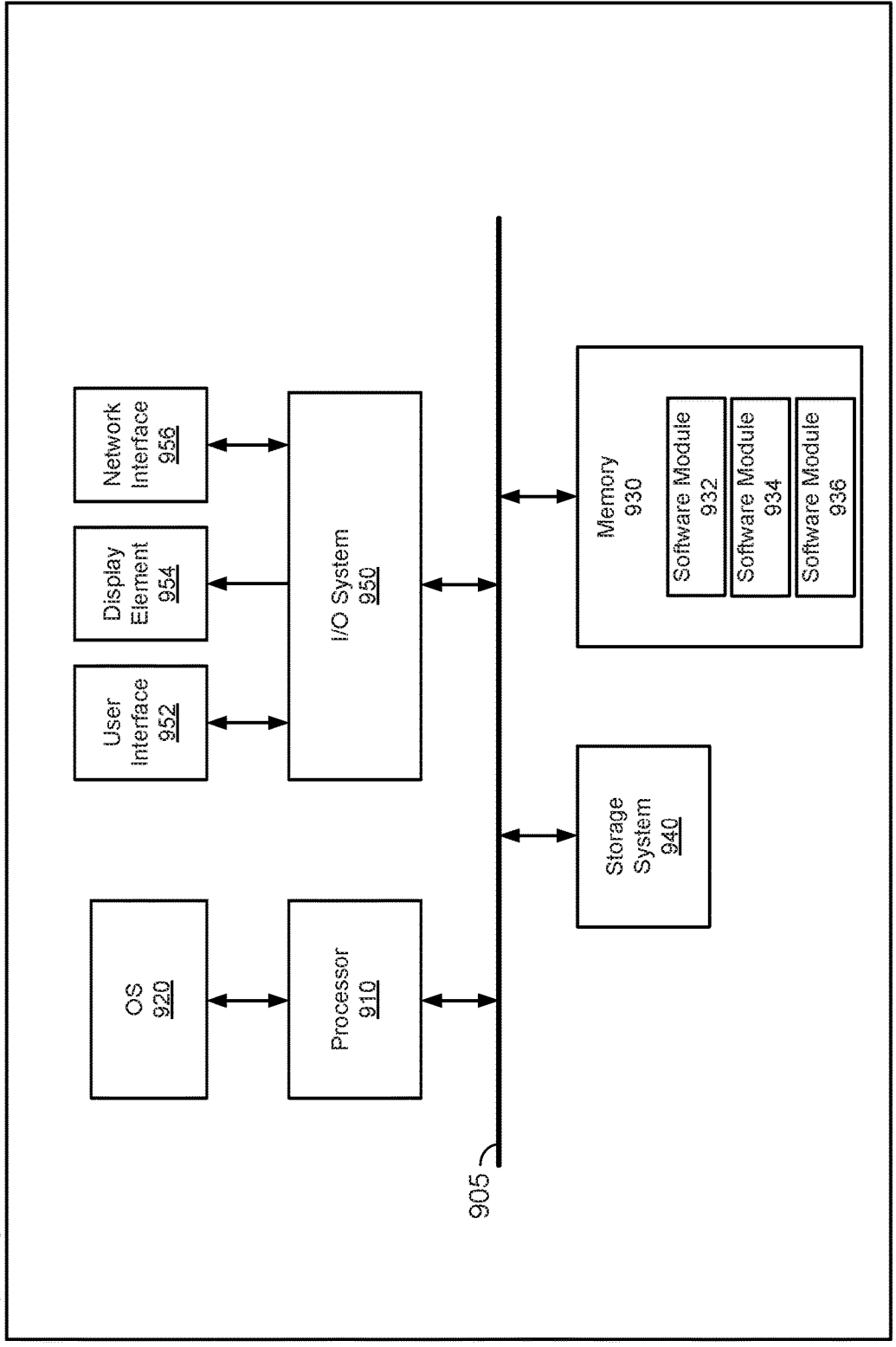
FIG. 9 depicts a block diagram of an example architecture of a computing device, in accordance with an embodiment of present disclosure.

FIG. 9 is a block diagram schematically illustrating a computing device 900, in accordance with certain of the embodiments disclosed herein. For example, computing device 900 can be used as one or more of sending computer 102, requesting computer 110, and security server 108 as described above in regard to FIG. 1.

In certain implementations, the computing device 900 can include any combination of a processor 910, a memory 930, a storage system 940, and an input/output (I/O) system 950. As can be further seen, a bus and/or interconnect 905 is also provided to allow for communication between the various components listed above and/or other components not shown. Other componentry and functionality not reflected in the block diagram of FIG. 9 will be apparent in light of this disclosure, and it will be appreciated that other embodiments are not limited to any particular hardware configuration.

The processor 910 can be any suitable processor, and may include one or more coprocessors or controllers, such as an audio processor, a graphics processing unit, or hardware accelerator, to assist in control and processing operations associated with computing device 900. In some embodiments, the processor 910 can be implemented as any number of processor cores. The processor (or processor cores) can be any type of processor, such as, for example, a microprocessor, an embedded processor, a digital signal processor (DSP), a graphics processor (GPU), a network processor, a field programmable gate array or other device configured to execute code. The processors can be multithreaded cores in that they may include more than one hardware thread context (or "logical processor") per core. Processor 910 can be implemented as a complex instruction set computer (CISC) or a reduced instruction set computer (RISC) processor.

In certain implementations, the processor 910 can be configured to execute an Operating System (OS) 920 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with computing device 900, and therefore may also be implemented using any suitable existing or subsequently-developed platform.

The memory 930 can be implemented using any suitable type of digital storage including, for example, flash memory and/or random-access memory (RAM). In some embodiments, the memory 930 can include various layers of memory hierarchy and/or memory caches as are known to those of skill in the art. The memory 930 can be implemented as a volatile memory device such as, but not limited to, a RAM, dynamic RAM (DRAM), or static RAM (SRAM) device. The storage system 940 can be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

In certain implementations, the memory 930 can include one or more software modules such as software module 932, software module 934, and software module 936 as shown in FIG. 9. The various software modules can include instructions that, when executed by processor 910, can cause the processor to perform one or more of the process steps and functions as described herein. For example, if computing device 900 represents the sending computer 102 as described herein, the various software modules 932, 934, 936 can include instructions for causing the processor 910 to perform the process as shown in FIG. 2 including, for example, causing the processor to create data, create various hash values of the data, digitally sign the data and the hash values, encrypt the data and the hash values, encapsulate the data and the hash values, and cause transmission of the data and the hash values to another device. Similarly, if the computing device 900 represents the security server 108 as described herein, the various software modules 932, 934, 936 can include instructions for causing the processor 910 to perform the processes as outlined in FIGS. 6 and 7 including, for example, causing the processor to receive the data from the sending computer, de-encapsulate the data and hash values, decrypt the data and hash values, verify the digital signatures, verify the hash values, and process the data for storage including indexing the data, encrypting the index information, encrypting the data, digitally signing the data, and transmitting the data and the index information to the data store. If the computing device 900 represents the requesting computer 110 as described herein, the various software modules 932, 934, 936 can include instructions for causing the processor 910 to perform the process as outlined above in regard to FIG. 8 escribing the functionality of the requesting computing including, for example, causing the processor to transmit a query to the security server, receive the data from the security server, de-encapsulate the data and hash values, decrypt the data and hash values, verify the digital signatures, verify the hash values, and present the data to the recipient.

The I/O system 950 can be configured to interface between various I/O devices and other components of the computing device 900. I/O devices may include, but not be limited to, a user interface 952, a display element 954, and a network interface 956.

It will be appreciated that in some embodiments, the various components of computing device 900 can be combined or integrated in a system-on-a-chip (SoC) architecture. In some embodiments, the components may be hardware components, firmware components, software components or any suitable combination of hardware, firmware or software.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments the computing device 900 can include additional, fewer, or alternative subcomponents as compared to those included in the example embodiment of FIG. 9.

Further Example Embodiments

The following examples pertain to further embodiments, from which numerous permutations and configurations will be apparent.

Example 1 includes a computer program product including one or more non-transitory machine-readable mediums encoding instructions that when executed by one or more processors cause a process to be carried out for securely storing data at a remote data store, the process including receiving encrypted data for storage at a remote data store, decrypting the encrypted data to produce decrypted data, generating index information for the decrypted data, encrypting the index information to produce encrypted index information, encrypting the decrypted data to produce re-encrypted data, digitally signing the re-encrypted data, and causing transmission of the re-encrypted data and the encrypted index information to the remote data store over an untrusted network.

Example 2 includes the subject matter of Example 1, wherein decrypting the encrypted data includes de-encapsulating the encrypted data and a plurality of hash values associated with the encrypted data, decrypting the encrypted data and the plurality of hash values, verifying at least one digital signature for the encrypted data and the plurality of hash values, and verifying the plurality of hash values.

Example 3 includes the subject matter of Example 1 or 2, wherein the index information includes portion markings related to a security level of the decrypted data.

Example 4 includes the subject matter of any of the preceding Examples, wherein encrypting the index information includes encrypting the index information with a homomorphic encryption technique.

Example 5 includes the subject matter of any of the preceding Examples, wherein encrypting the decrypted data to produce re-encrypted data includes encrypting the decrypted data using a multi-part encryption scheme.

Example 6 includes the subject matter of any of the preceding Examples, wherein the multi-part encryption scheme includes both a Suite B encryption technique and a (k, n) threshold encryption technique.

Example 7 includes the subject matter of any of the preceding Examples, further including additional instructions that when executed by one or more processors cause the one or more processors to receive a query for stored data from a requesting computer, encrypt the query to produce an encrypted query, cause transmission of the encrypted query to the remote data store, and receive a copy of the stored data from the remote data store.

Example 8 includes the subject matter of any of the preceding Examples, further including additional instructions that when executed by one or more processors cause the one or more processors to generate a plurality of hash values for the copy of the stored data, digitally sign the copy of the stored data and the plurality of hash values using one or more certificates to generate a signed copy of the stored data and a set of signed hash values, encrypt the signed copy of the stored data and the set of signed hash values using at least one encryption technique to generate an encrypted copy of the stored data and a set of encrypted hash values, encapsulate the encrypted copy of the stored data and the set of encrypted hash values using at least one encapsulation protocol to create an encapsulated copy of the stored data and an encapsulated set of hash values, and cause transmission of the encapsulated copy of the stored data and the encapsulated set of hash values over an untrusted network to the requesting computer.

Example 9 includes the subject matter of any of the preceding Examples, wherein the at least one encryption technique includes a one-time pad encryption scheme that uses a one-time shared key.

Example 10 includes the subject matter of any of the preceding Examples, wherein causing transmission of the encapsulated copy of the stored data and the encapsulated set of hash values includes causing transmission of the encapsulated copy of the stored data and the encapsulated set of hash values using a zero knowledge communication protocol.

Example 11 includes a communication system including one or more non-transitory machine-readable mediums configured to store instructions and one or more processors being configured to execute the instructions stored on the one or more non-transitory machine-readable mediums, wherein execution of the instructions causes the one or more processors to receive encrypted data for storage at a remote data store, decrypt the encrypted data to produce decrypted data, generate index information for the decrypted data, encrypt the index information to produce encrypted index information, encrypt the decrypted data to produce re-encrypted data, digitally sign the re-encrypted data, and cause transmission of the re-encrypted data and the encrypted index information to the remote data store over an untrusted network.

Example 12 includes the subject matter of Example 11, wherein the instructions for causing the one or more processors to decrypt the encrypted data include additional instructions for causing the one or more processors to de-encapsulate the encrypted data and a plurality of hash values associated with the encrypted data, decrypt the encrypted data and the plurality of hash values, verify at least one digital signature for the encrypted data and the plurality of hash values, and verify the plurality of hash values.

Example 13 includes the subject matter of Example 11 or 12, wherein the index information includes portion markings related to a security level of the decrypted data.

Example 14 includes the subject matter of any of Examples 11 through 13, wherein the instructions for causing the one or more processors to encrypt the index information include additional instructions for causing the one or more processors to encrypt the index information with a homomorphic encryption technique.

Example 15 includes the subject matter of any of Examples 11 through 14, wherein the instructions for causing the one or more processors to encrypt the decrypted data to produce re-encrypted data include additional instructions for causing the one or more processors to encrypt the decrypted data using a multi-part encryption scheme.

Example 16 includes the subject matter of any of Examples 11 through 15, wherein the multi-part encryption scheme includes both a Suite B encryption technique and a (k, n) threshold encryption technique.

Example 17 includes the subject matter of any of Examples 11 through 16, further including additional instructions that when executed by one or more processors cause the one or more processors to receive a query for stored data from a requesting computer, encrypt the query to produce an encrypted query, cause transmission of the encrypted query to the remote data store, receive a copy of the stored data from the remote data store, process the copy of the stored data, and cause transmission of the stored data to the requesting computer.

Example 18 includes the subject matter of any of Examples 11 through 17, further including additional instructions that when executed by one or more processors cause the one or more processors to generate a plurality of hash values for the copy of the stored data, digitally sign the copy of the stored data and the plurality of hash values using one or more certificates to generate a signed copy of the stored data and a set of signed hash values, encrypt the signed copy of the stored data and the set of signed hash values using at least one encryption technique to generate an encrypted copy of the stored data and a set of encrypted hash values, encapsulate the encrypted copy of the stored data and the set of encrypted hash values using at least one encapsulation protocol to create an encapsulated copy of the stored data and an encapsulated set of hash values, and cause transmission of the encapsulated copy of the stored data and the encapsulated set of hash values over an untrusted network to the requesting computer.

Example 19 includes the subject matter of any of Examples 11 through 18, wherein the at least one encryption technique includes a one-time pad encryption scheme that uses a one-time shared key.

Example 20 includes the subject matter of any of Examples 11 through 19, wherein causing transmission of the encapsulated copy of the stored data and the encapsulated set of hash values includes causing transmission of the encapsulated copy of the stored data and the encapsulated set of hash values using a zero knowledge communication protocol.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer program product including one or more non-transitory machine-readable mediums encoding instructions that when executed by one or more processors cause a process to be carried out for securely storing data at a remote data store, the process comprising:
   receiving encrypted data for storage at a remote data store;
   decrypting the encrypted data to produce decrypted data;
   generating index information for the decrypted data;
   encrypting the index information to produce encrypted index information;
   encrypting the decrypted data to produce re-encrypted data;
   digitally signing the re-encrypted data; and
   causing transmission of the re-encrypted data and the encrypted index information to the remote data store over a network;
   wherein decrypting the encrypted data comprises:
      de-encapsulating the encrypted data and one or more hash values associated with the encrypted data;
      decrypting the encrypted data and the one or more hash values;
      verifying at least one digital signature for the encrypted data and the one or more hash values; and
      verifying the one or more hash values.

2. The computer program product of claim 1, wherein the index information comprises portion markings related to a security level of the decrypted data.

3. The computer program product of claim 1, wherein encrypting the index information comprises encrypting the index information with a homomorphic encryption technique.

4. The computer program product of claim 1, wherein encrypting the decrypted data to produce re-encrypted data comprises encrypting the decrypted data using a two-part encryption scheme.

5. The computer program product of claim 4, wherein the two-part encryption scheme comprises both a Suite B encryption technique and a (k, n) threshold encryption technique.

6. The computer program product of claim 1, further comprising additional instructions that when executed by one or more processors cause the one or more processors to:
   receive a query for stored data from a requesting computer;
   encrypt the query to produce an encrypted query;
   cause transmission of the encrypted query to the remote data store; and
   receive a copy of the stored data from the remote data store.

7. The computer program product of claim 6, further comprising additional instructions that when executed by one or more processors cause the one or more processors to:
   generate a plurality of hash values for the copy of the stored data;
   digitally sign the copy of the stored data and the plurality of hash values using one or more certificates to generate a signed copy of the stored data and a set of signed hash values;
   encrypt the signed copy of the stored data and the set of signed hash values using at least one encryption technique to generate an encrypted copy of the stored data and a set of encrypted hash values;
   encapsulate the encrypted copy of the stored data and the set of encrypted hash values using at least one encapsulation protocol to create an encapsulated copy of the stored data and an encapsulated set of hash values; and
   cause transmission of the encapsulated copy of the stored data and the encapsulated set of hash values over an untrusted network to the requesting computer.

8. The computer program product of claim 7, wherein the at least one encryption technique comprises a one-time pad encryption scheme that uses a one-time shared key.

9. The computer program product of claim 7, wherein causing transmission of the encapsulated copy of the stored data and the encapsulated set of hash values comprises causing transmission of the encapsulated copy of the stored data and the encapsulated set of hash values using a zero knowledge communication protocol.

10. A communication system comprising:
   one or more non-transitory machine-readable mediums configured to store instructions; and
   one or more processors being configured to execute the instructions stored on the one or more non-transitory machine-readable mediums, wherein execution of the instructions causes the one or more processors to:
      receive encrypted data for storage at a remote data store;
      decrypt the encrypted data to produce decrypted data;

generate index information for the decrypted data;
encrypt the index information to produce encrypted index information;
encrypt the decrypted data to produce re-encrypted data;
digitally sign the re-encrypted data; and
cause transmission of the re-encrypted data and the encrypted index information to the remote data store over a network;
wherein the instructions for causing the one or more processors to decrypt the encrypted data comprise additional instructions for causing the one or more processors to:
de-encapsulate the encrypted data and one or more hash values associated with the encrypted data;
decrypt the encrypted data and the one or more hash values;
verify at least one digital signature for the encrypted data and the one or more hash values; and
verify the one or more hash values.

11. The system of claim 10, wherein the index information comprises portion markings related to a security level of the decrypted data.

12. The system of claim 10, wherein the instructions for causing the one or more processors to encrypt the index information comprise additional instructions for causing the one or more processors to encrypt the index information with a homomorphic encryption technique.

13. The system of claim 10, wherein the instructions for causing the one or more processors to encrypt the decrypted data to produce re-encrypted data comprise additional instructions for causing the one or more processors to encrypt the decrypted data using a multi-part encryption scheme.

14. The system of claim 13, wherein the multi-part encryption scheme comprises both a Suite B encryption technique and a (k, n) threshold encryption technique.

15. The system of claim 10, further comprising additional instructions that when executed by one or more processors cause the one or more processors to:
receive a query for stored data from a requesting computer;
encrypt the query to produce an encrypted query;
cause transmission of the encrypted query to the remote data store;
receive a copy of the stored data from the remote data store;
process the copy of the stored data; and
cause transmission of the stored data to the requesting computer.

16. The system claim 15, further comprising additional instructions that when executed by one or more processors cause the one or more processors to:
generate a plurality of hash values for the copy of the stored data;
digitally sign the copy of the stored data and the plurality of hash values using one or more certificates to generate a signed copy of the stored data and a set of signed hash values;
encrypt the signed copy of the stored data and the set of signed hash values using at least one encryption technique to generate an encrypted copy of the stored data and a set of encrypted hash values;
encapsulate the encrypted copy of the stored data and the set of encrypted hash values using at least one encapsulation protocol to create an encapsulated copy of the stored data and an encapsulated set of hash values; and
cause transmission of the encapsulated copy of the stored data and the encapsulated set of hash values over an untrusted network to the requesting computer.

17. The system of claim 16, wherein the at least one encryption technique comprises a one-time pad encryption scheme that uses a one-time shared key.

18. The system of claim 16, wherein causing transmission of the encapsulated copy of the stored data and the encapsulated set of hash values comprises causing transmission of the encapsulated copy of the stored data and the encapsulated set of hash values using a zero knowledge communication protocol.

* * * * *